（12）United States Patent
Ikeda et al.

(10) Patent No.: US 11,114,720 B2
(45) Date of Patent: Sep. 7, 2021

(54) CYLINDRICAL BATTERY HOUSING CASE

(71) Applicant: YAZAKI CORPORATION, Tokyo (JP)

(72) Inventors: Tomohiro Ikeda, Shizuoka (JP);
Yoshiaki Ichikawa, Shizuoka (JP);
Hirotaka Mukasa, Shizuoka (JP);
Taishi Sakai, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 578 days.

(21) Appl. No.: 14/966,355

(22) Filed: Dec. 11, 2015

(65) Prior Publication Data

US 2016/0099448 A1    Apr. 7, 2016

Related U.S. Application Data

(63) Continuation of application No. PCT/JP2014/065512, filed on Jun. 11, 2014.

(30) Foreign Application Priority Data

Jun. 14, 2013   (JP) .............................. JP2013-126055

(51) Int. Cl.
*H01M 50/20*       (2021.01)
*B60L 3/00*        (2019.01)
(Continued)

(52) U.S. Cl.
CPC ........... *H01M 50/20* (2021.01); *B60L 3/0046* (2013.01); *B60L 50/64* (2019.02); *B60L 58/21* (2019.02);
(Continued)

(58) Field of Classification Search
CPC ...... H01M 2/10; H01M 2/1077; H01M 2/105; H01M 2/022; H01M 2220/20;
(Continued)

(56) References Cited

U.S. PATENT DOCUMENTS

2007/0051663 A1   3/2007   Foreman et al.
2008/0099370 A1   5/2008   Foreman et al.
(Continued)

FOREIGN PATENT DOCUMENTS

JP         64-29769 U     2/1989
JP         2004-220869 A  8/2004
(Continued)

OTHER PUBLICATIONS

English translation of JP2010-009798.*
(Continued)

*Primary Examiner* — Milton I Cano
*Assistant Examiner* — Kiran Akhtar
(74) *Attorney, Agent, or Firm* — Kenealy Vaidya LLP

(57) ABSTRACT

A cylindrical battery housing case has a plurality of cylindrical battery housing chambers each housing one cylindrical battery, and a plurality of elongated resilient members each having a protrusion for holding a cylindrical portion of the cylindrical battery is formed in a cantilevered manner inside notches in a side wall of each of the cylindrical battery housing chambers.

2 Claims, 8 Drawing Sheets

(51) Int. Cl.
  *B60L 58/21* (2019.01)
  *B60L 50/64* (2019.01)
(52) U.S. Cl.
  CPC .... *B60L 2270/145* (2013.01); *H01M 2220/20* (2013.01); *Y02T 10/70* (2013.01)
(58) Field of Classification Search
  CPC ..... H01M 50/20; H01M 50/64; B60L 3/0046; B60L 11/1864; B60L 11/1879; B60L 2270/145; B60L 58/21; B60L 50/64; Y02T 10/7005; Y02T 10/7061; Y02T 10/70
  USPC ........................................................ 429/176
  See application file for complete search history.

(56) References Cited

U.S. PATENT DOCUMENTS

| | | | | |
|---|---|---|---|---|
| 2011/0039142 A1* | 2/2011 | Kwag | ................... | H01M 2/105 429/99 |
| 2013/0062247 A1 | 3/2013 | Foreman et al. | | |
| 2014/0045038 A1 | 2/2014 | Kimura et al. | | |

FOREIGN PATENT DOCUMENTS

| | | | | | |
|---|---|---|---|---|---|
| JP | 2009-507342 | * | 3/2008 | .............. | H01M 2/10 |
| JP | 2009-507342 A | | 2/2009 | | |
| JP | 2010-009798 | * | 1/2010 | .............. | H01M 2/10 |
| JP | 2010-9798 A | | 1/2010 | | |
| JP | 2011-40382 A | | 2/2011 | | |
| JP | 2012-74338 A | | 4/2012 | | |
| JP | 2014-2850 A | | 1/2014 | | |
| WO | 2012/147134 A1 | | 11/2012 | | |

OTHER PUBLICATIONS

English translation of JP2009-507342.*
International Search Report for PCT/JP2014/065512 dated Sep. 2, 2014.
English language Written Opinion of the International Search Report for PCT/JP2014/065512 dated Sep. 2, 2014.
Japanese Office Action for the related Japanese Patent Application No. 2013-126055 dated Mar. 21, 2017.

* cited by examiner

_US 11,114,720 B2_

CYLINDRICAL BATTERY HOUSING CASE

CROSS REFERENCE TO RELATED APPLICATIONS

This application is a continuation of International Patent Application No. PCT/JP2014/065512 filed on Jun. 11, 2014, claiming priority from Japanese Patent Application No. 2013-126055 filed on Jun. 14, 2013, the contents of which are incorporated herein by reference.

FIELD OF INVENTION

The present invention relates to a cylindrical battery housing case for housing numerous cylindrical batteries, more particularly, to a cylindrical battery housing case that is not broken by vibration.

BACKGROUND ART

In electric automobiles including hybrid vehicles, numerous cylindrical batteries connected in series and parallel are used to obtain a desired voltage and a desired current from the batteries. Hence, cylindrical battery housing cases for stably connecting numerous cylindrical batteries in series and parallel have been proposed (see, e.g., JP2012-74338A).

FIG. 6A is a perspective view of a related art cylindrical battery housing case in which cylindrical batteries are housed, and FIG. 6B is an exploded perspective view of the cylindrical battery housing case of FIG. 6A.

In FIGS. 6A and 6B, a cylindrical battery housing case 100 has a rectangular shape, and includes a metal housing 102 having an upper surface portion, a bottom surface portion opposed thereto and two side surface portions opposed to each other in the longitudinal direction of the rectangular body, and two side plates 103, flat plate members, opposed to each other in the short-side direction of the rectangular body.

Inside the metal housing 102, a number of housing chambers for housing cylindrical batteries C are formed, and the cylindrical batteries C are housed in the housing chambers so that the axial directions of the batteries are oriented in the lateral direction of the cylindrical battery housing case.

The side plates 103 are molded articles made of an insulating resin and are secured to the metal housing 102 so as to be opposed to each other in the lateral direction of the metal housing 102. The side plate 103 is provided with through holes bored in the lateral direction at portions whose centers are aligned with the axes of the respective cylindrical batteries C. The diameter of the through hole is smaller than the diameter of the cylindrical battery C. The cylindrical batteries C are held between the side plates 103 and secured thereto and are insulated from the metal housing 102.

Bus bars 104 each formed of a strip-shaped conductive thin metal plate are used to electrically connect the plurality of cylindrical batteries C in series. The bus bars 104 are separated from the side plates 103. The flat face portions of both the end sections of the bus bar 104 are joined to the electrode sections of two cylindrical batteries C. The flat face portion (the crossover portion between the portions to be welded to two cylindrical batteries C) in the middle of both the end sections is disposed at a position higher than that of the portions to be joined to the cylindrical batteries C, is bent perpendicularly from the portions to be welded to the cylindrical batteries C to avoid interference with the side plate 103, and is raised to a position in which the flat face portion can straddle the wall formed between the through holes of the side plate 103.

The side plate 103 is provided with a voltage detection board 105 having a plurality of voltage detection conductors for detecting the voltages of the plurality of cylindrical batteries C.

The side plate 103, the plurality of bus bars 104 and the voltage detection board 105 constitute a side plate assembly 106. The side plate assembly 106 is secured to the metal housing 102 using a plurality of screws 109. The voltage detection board 105 of the side plate assembly 106 is electrically connected to all the bus bars 104 by fastening screws 110.

FIG. 7A is an enlarged perspective view of a portion of a cylindrical battery housing case according to another related art, and FIG. 7B is an enlarged view of the portion 7B of FIG. 7A In FIG. 7A, two metal housings 102 are provided and they are respectively disposed on the front side and the rear side as shown in FIG. 7A. The respective metal housings 102 are the same in structure, and one cylindrical battery C is housed in each of a plurality of cylindrical battery housing chambers 102R provided in each metal housing. The respective cylindrical battery housing chambers 102R have the same internal shape. Furthermore, the respective cylindrical batteries C have the same cylindrical shape, each having an anode and a cathode In the five cylindrical battery housing chambers 102R arranged in a row in the vertical direction on the rightmost side in FIG. 7A, one cylindrical battery C is housed in each chamber such that the anode side of the battery is disposed, for example, on the front side of the cylindrical battery housing chamber 102R and the cathode side thereof is disposed on the rear side of the cylindrical battery housing chamber 102R.

As shown in FIG. 7B, the inside diameter of the cylindrical battery housing chamber 102R is slightly larger than the outside diameter of the cylindrical battery C so that the cylindrical battery C is smoothly housed into the cylindrical battery housing chamber 102R.

FIG. 8A is a front view of the cylindrical battery housing case of FIG. 7A, FIG. 8B is a cross-sectional view taken along the line 8B-8B of FIG. 8A, and FIG. 8C is an enlarged view of the portion 8C of FIG. 8B.

In FIG. 8A, in the case that the cylindrical battery housing case 100 is sectioned in the longitudinal direction of the cylindrical batteries C on the straight line 8B-8B passing through the electrodes of the cylindrical batteries housed in the cylindrical battery housing chambers 102R at the lowermost layer, a state in which the cylindrical batteries C positioned in odd-numbered rows are housed in the cylindrical battery housing case 100 is observed as shown in FIG. 8B. The cylindrical battery housing chamber 102R for housing each cylindrical battery C is formed of partition walls 100W so that a cylindrical space is formed inside.

FIG. 8C is an enlarged view of the portion 8C of FIG. 8B. In FIG. 8C, the inside diameter of the cylindrical battery housing chamber 102R is T100, and the outside diameter of the cylindrical portion of the cylindrical battery C is Tc (Tc<T100). Hence, the difference (T100−Tc) is the clearance (allowance or gap) for allowing the cylindrical battery C to be housed smoothly into the cylindrical battery housing chamber 102R with high working efficiency.

However, since the numerous cylindrical batteries C are housed in the cylindrical battery housing chambers 102R with the clearance, the cylindrical batteries C rattle inside the cylindrical battery housing chambers 102R during vehicle vibration, and repetitive stress is generated; if this continues for a long time, there is a risk that the welded section between the cylindrical battery C and the bus bar may be broken or the bus bar itself may be broken.

Another related art cylindrical battery housing case is configured to prevent cylindrical batteries from rattling inside the cylindrical battery housing chambers (see, e.g., JP2009-289656A). In the cylindrical battery housing case, protrusions extending to the cylindrical battery are formed at the end sections on the side faces of the cylindrical battery housing chamber in which the cylindrical battery is housed with a clearance, the inside diameter between the protrusions is made slightly smaller than the outside diameter of the cylindrical battery, and the cylindrical battery is press-fitted between the protrusions on the end sections of the side faces of the cylindrical battery housing chamber, whereby the battery is prevented from rattling.

Since the rattling is prevented by press-fitting the cylindrical battery between the protrusions on the end sections of the side faces of the cylindrical battery housing chamber, a large insertion force is required each time when numerous cylindrical batteries are housed in the cylindrical battery housing chambers, whereby the efficiency of the working for housing the cylindrical batteries into the cylindrical battery housing chambers is reduced.

Moreover, during vehicle vibration, the cylindrical batteries are not allowed to move and cannot move, whereby a large resistance force is generated between the cylindrical battery and the protrusions; if the resistance force is generated repeatedly and continuously for a long time, there is a risk that the cylindrical battery and the protrusions may be broken.

SUMMARY

Illustrative aspects of the present invention provide a cylindrical battery housing case in which rattling is prevented so as to be safe from being damaged even when high vibration occurs and to achieve high working efficiency by allowing cylindrical batteries to be housed in cylindrical battery housing chambers with low insertion force.

According to an illustrative aspect of the present invention, a cylindrical battery housing case has a plurality of cylindrical battery housing chambers, each of the cylindrical battery housing chambers being configured to house one cylindrical battery. Each of the cylindrical battery housing chambers has a side wall having a plurality of notches and a plurality of elongated resilient members provided in a cantilevered manner inside the notches, each of the elongated resilient members having a protrusion configured to hold a cylindrical portion of the cylindrical battery. The plurality of cylindrical battery housing chambers includes a first cylindrical battery housing chamber and a second cylindrical battery housing chamber adjacent to the first cylindrical battery housing chamber, the plurality of elongated resilient members of the first the cylindrical battery housing chamber having a first elongated resilient member and a second elongated resilient member, and the plurality of elongated resilient members of the second cylindrical battery housing chamber having a third elongated resilient member arranged at an intermediate position between the first elongated resilient member and the second elongated resilient member in a front view of the cylindrical battery housing case.

According to the configuration described above, the cylindrical battery is prevented from rattling even if high vibration occurs, whereby there is no risk that the welded section between the battery and the bus bar may be broken or the bus bar itself may be broken. Further, the cylindrical battery can be housed into the cylindrical battery housing chamber with a low insertion force, whereby working efficiency is improved. With the elongated resilient members being provided the cantilevered manner, sturdy elongated resilient members can be formed with a simple structure. With the arrangement of described above, the elongated resilient members formed in a cylindrical battery housing chamber are shifted from the elongated resilient members formed in the adjacent cylindrical battery housing chamber in the circumferential direction in a front view, whereby space saving can be attained.

According to one or more illustrative aspects of the present invention described above, there is provided a cylindrical battery housing case in which rattling is prevented so as to be safe from being damaged even when high vibration occurs and to achieve high working efficiency by allowing cylindrical batteries to be housed in cylindrical battery housing chambers with low insertion force.

DETAILED DESCRIPTION

Described blow, with reference to FIGS. 1 to 5, is a cylindrical battery housing case according to an exemplary embodiment of the present invention in which rattling is prevented so as to be safe from being damaged even when high vibration occurs and to achieve high working efficiency by allowing cylindrical batteries to be housed in cylindrical battery housing chambers with low insertion force.

Figure 1A:
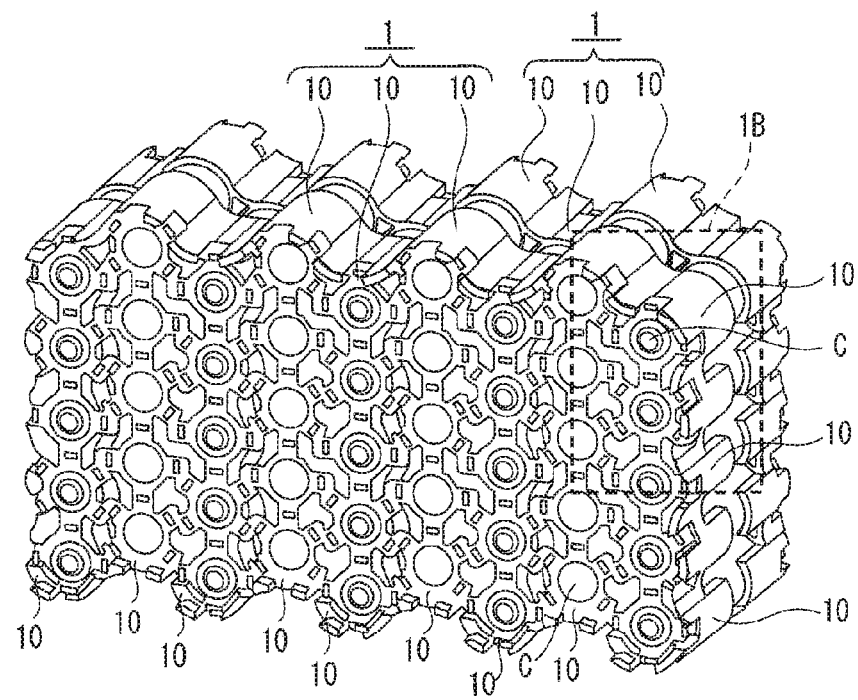
FIG. 1A is a perspective view of a state in which cylindrical batteries are housed in a cylindrical battery housing case according to an exemplary embodiment of the present invention.
Figure 1B:
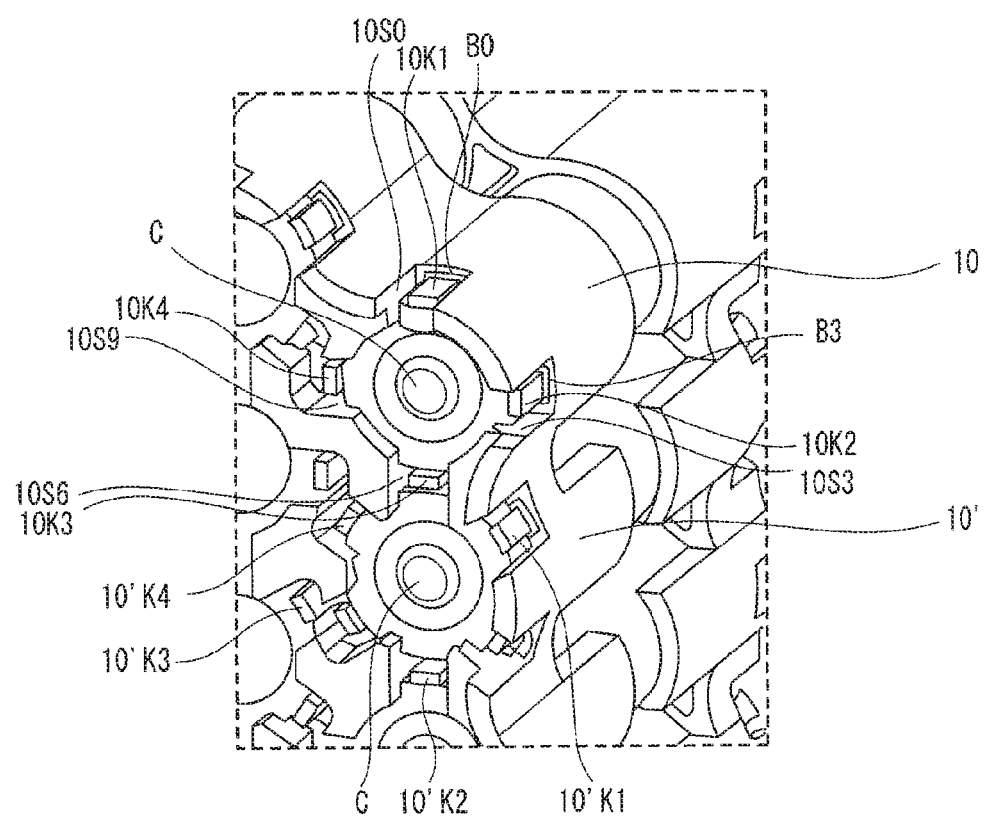
FIG. 1B is an enlarged view of the portion 1B of FIG. 1A.
Figure 2:
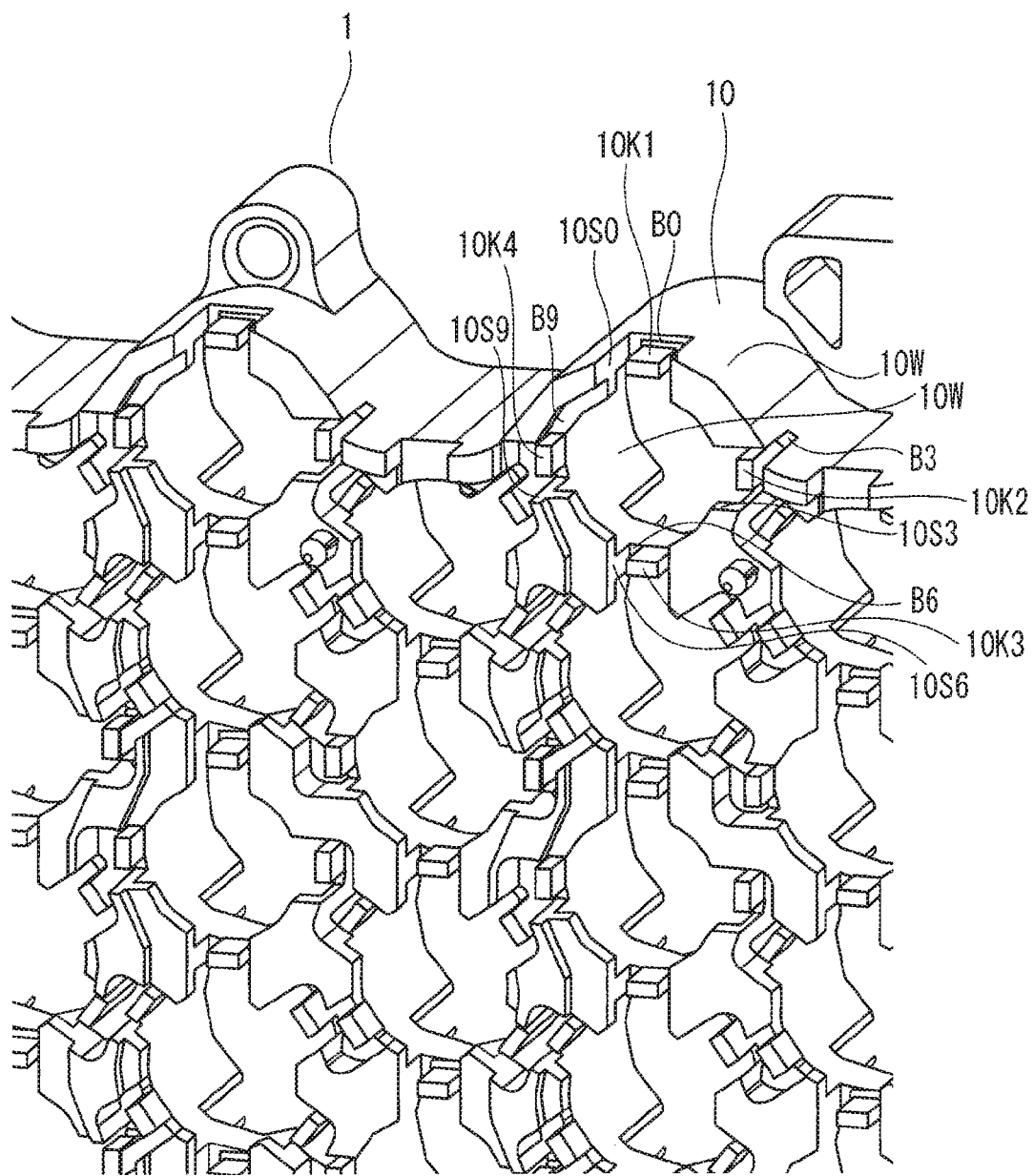
FIG. 2 is an enlarged perspective view of a portion of the cylindrical battery housing case in a state in which the cylindrical batteries are not housed.

FIG. 1A is a perspective view showing a state in which cylindrical batteries are housed in a cylindrical battery housing case according to an exemplary embodiment of the present invention, FIG. 1B is an enlarged view of the portion 1B of FIG. 1A, and FIG. 2 is an enlarged perspective view of the cylindrical battery housing case in a state in which the cylindrical batteries are not housed.

A high-voltage high-current battery apparatus includes two cylindrical battery housing cases, a plurality of cylindrical batteries, and a plurality of bus bars. The cylindrical battery housing cases will be described below in detail.

In FIG. 1A, two cylindrical battery housing cases 1 are used. In the drawing, one is provided on the front side and the other is provided on the rear side. The two cylindrical battery housing cases 1 have the same structure. One cylindrical battery C is housed in one elongated cylindrical battery housing chamber 10 formed by combining the two cylindrical battery housing cases 1. All the cylindrical batteries to be housed therein have the same shape, a cylindrical shape having an anode and a cathode on the opposite faces.

Hereinafter, description will be made with respect to one cylindrical battery housing case 1. The cylindrical battery housing case 1 has a substantially rectangular shape as a whole in which the total of forty five cylindrical battery housing chambers 10 are provided, five chambers in a vertical row and nine rows arranged in lateral direction.

When housing the cylindrical batteries C in the cylindrical battery housing chambers 10, vertically arranged five cylindrical batteries C in the rightmost row (first row) are housed such that the electrode directions are all the same (for example, the anode is positioned on the front side), and the vertically arranged five cylindrical batteries C in the second row to the left are arranged such that the electrode directions thereof are opposite to those of the cylindrical batteries C in the first row (for example, the cathode is positioned on the front side).

The cylindrical battery housing chambers 10 in the first row and the cylindrical battery housing chambers 10 in the second row are slightly shifted one another in the vertical direction so as to be arranged in a staggered manner, whereby battery housing density per unit volume is increased.

The vertically arranged five cylindrical battery housing chambers 10 in the third row are at the same level as the vertically arranged five cylindrical battery housing chambers 10 in the first row, and the vertically arranged five cylindrical battery housing chambers 10 in the fourth row are at the same level as those of the vertically arranged five cylindrical battery housing chambers 10 in the second row.

Similarly, the cylindrical battery housing chambers 10 in odd-numbered rows are at the same level as the cylindrical battery housing chambers 10 in the first row, and the cylindrical battery housing chambers 10 in even-numbered rows are at the same level as the cylindrical battery housing chambers 10 in the second row.

Next, the structure of the cylindrical battery housing chamber 10 will be described with reference to FIG. 1B, an enlarged view of the portion 1B of FIG. 1A, and also FIG. 2. The cylindrical battery housing chamber 10 in FIG. 1B is formed by a side wall 10W (see FIG. 2) having an internal space capable of housing the cylindrical battery C having a cylindrical shape, and a notch 10S0 is formed from the front end of the side wall 10W toward the center of the side wall in the axial direction, and further inside the notch 10S0, an elongated resilient member 10K1 formed with a protrusion 10N1 (see FIG. 4B) facing inward (toward the battery) at its distal end is provided such that it is supported at the bottom B0 of the notch 10S0 in a cantilevered manner.

The notches are provided at four locations on the side wall 10W of the cylindrical battery housing chamber 10. Viewing the cylindrical battery housing chamber 10 as a round clock in a front view, the four locations are a 0 o'clock (12 o'clock) position at which a first notch 10S0 is provided, a 3 o'clock position at which a second notch 10S3 is provided, a 6 o'clock position at which a third notch 10S6 is provided, and a 9 o'clock position at which a fourth notch 10S9 is provided.

Inside each notch, the elongated resilient member is provided such that it is supported at the bottom of the notch in a cantilevered manner.

As shown in FIGS. 1B and 2, inside the notch 10S0, the elongated resilient member 10K1 formed with the protrusion facing inward (toward the battery) at its distal end is provided such that it is supported at the bottom B0 of the notch 10S0 in a cantilevered manner. The protrusion of the elongated resilient member 10K1 serves to hold the cylindrical portion of the cylindrical battery C.

Similarly, inside the notch 10S3 provided at the 3 o'clock position, an elongated resilient member 10K2 is provided such that it is supported at the bottom B3 of the notch 10S3 in a cantilevered manner.

Similarly, inside the notch 10S6 provided at the 6 o'clock position, an elongated resilient member 10K3 is provided such that it is supported at the bottom B6 of the notch 10S6 in a cantilevered manner.

Similarly, inside the notch 10S9 provided at the 9 o'clock position, an elongated resilient member 10K4 is provided such that it is supported at the bottom B9 of the notch 10S9 in cantilevered manner.

Next, the shape of the elongated resilient members 10K1-10K4 will be described using FIG. 3.

Figure 3A:
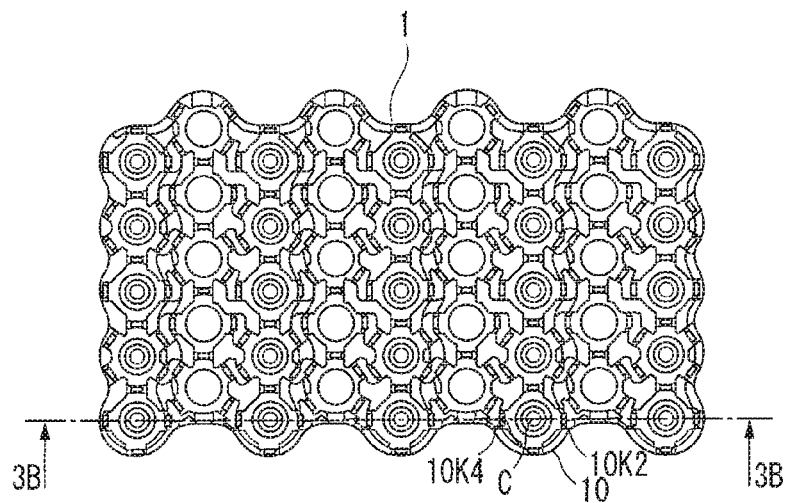
FIG. 3A is a front view of the cylindrical battery housing case of FIG. 1A.
Figure 3B:
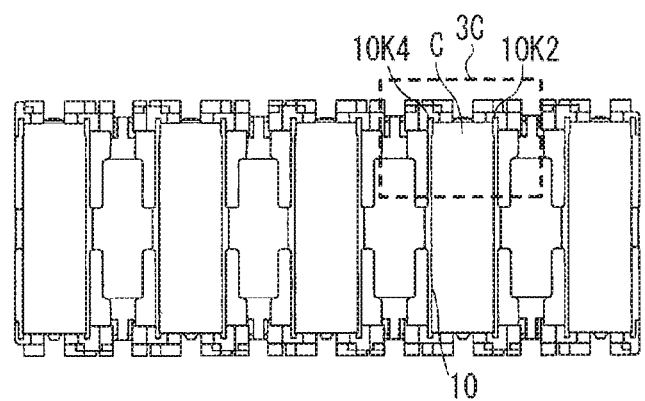
FIG. 3B is a cross-sectional view taken along the line 3B-3B of the FIG. 3A.
Figure 3C:
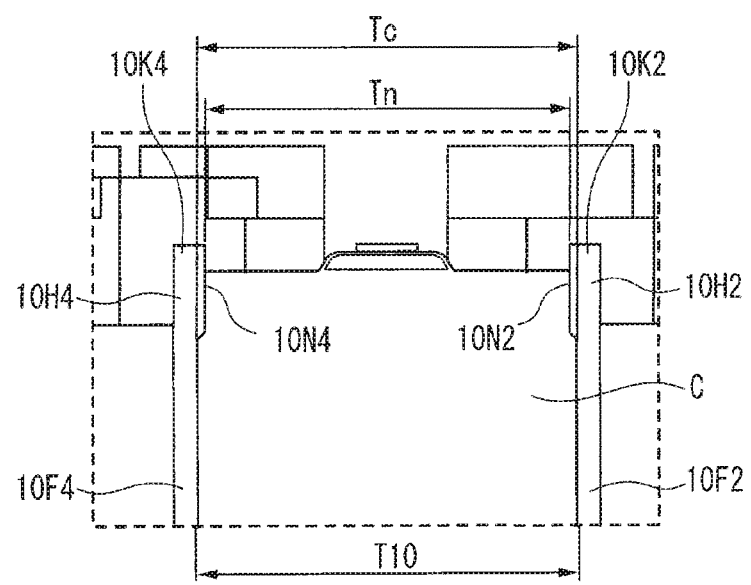
FIG. 3C is an enlarged view of the portion 3C of FIG. 3B.

FIG. 3A is a front view of the cylindrical battery housing case of FIG. 1A, FIG. 3B is a cross-sectional view taken along the line 3B-3B of the FIG. 3A, and FIG. 3C is an enlarged view of the portion 3C of FIG. 3B.

In FIG. 3A, the cylindrical battery C housed in the cylindrical battery housing chamber 10 in the third row from the right at the lowermost layer of the cylindrical battery housing case 1 is taken as an example and described below.

As shown in FIG. 3C, an enlarged view of the distal end portion of the cylindrical battery C housed in the cylindrical battery housing chamber 10 in the third row, the elongated resilient member 10K2 extending upward in a cantilevered manner from the bottom B3 (FIG. 2) of the notch 10S3 (FIG. 2) formed in the side wall 10W (FIG. 2) of the cylindrical battery housing chamber 10 has a leg portion 10F2 and a head portion 10H2. Because of its elongated body, the leg portion 10F2 is flexible by virtue of the elasticity of the material itself. The head portion H2 is formed with a protrusion 10N2 tapering toward the inner side (toward the battery insertion side).

Similarly, the elongated resilient member 10K4 extending upward in a cantilevered manner from the bottom B9 (FIG. 2) of the notch 10S9 (FIG. 2) formed in the side wall 10W (FIG. 2) of the cylindrical battery housing chamber 10 has a leg portion 10F4 and a head portion 10H4. The leg portion 10F4 is flexible by virtue of its elasticity. The head portion 10H4 is formed with a protrusion 10N4 tapering toward the inner side (toward the battery insertion side).

The distance between the protrusion 10N2 of the elongated resilient member 10K2 and the protrusion 10N4 of the elongated resilient member 10K4 is Tn, the outside diameter of the cylindrical portion of the cylindrical battery C is Tc and the inside diameter of the cylindrical battery housing chamber 10 is T10, and they satisfy the relationship of Tn<Tc<T10. In other words, there is a slight clearance (T10−Tc) for allowing the cylindrical battery C to be smoothly inserted into the cylindrical battery housing chamber 10.

Further, (Tc−Tn)/2 is a distance in which each of the protrusions 10N2, 10N4 at the distal ends of the elongated resilient members 10K2, 10K4 is displaced (moved back) by the bending of the elongated resilient members 10K2, 10K4.

Figure 4A:
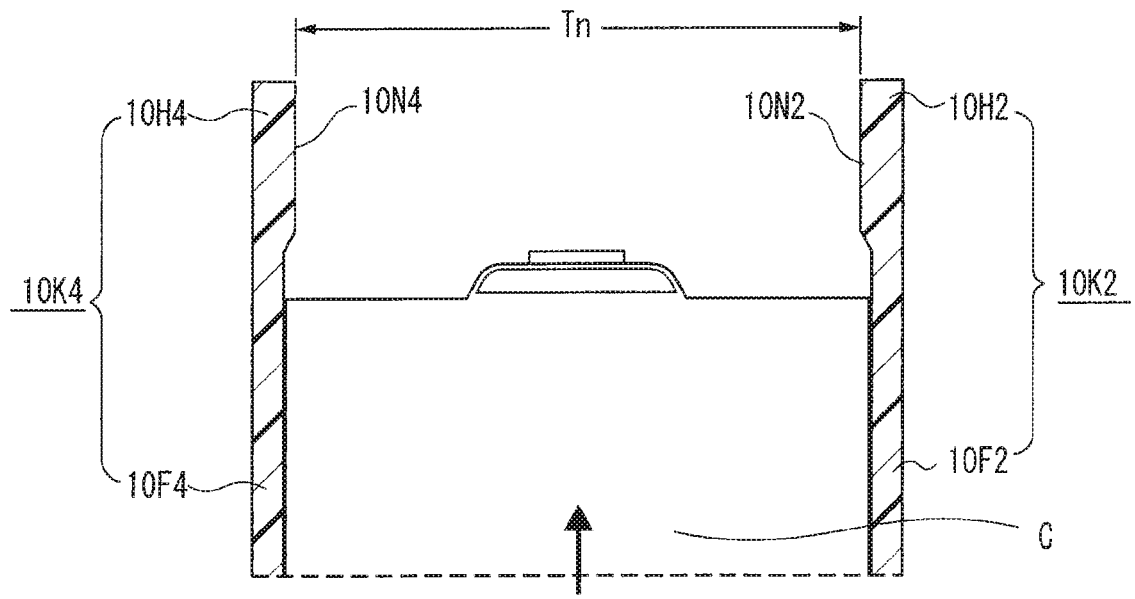
FIG. 4A is a cross-sectional view illustrating a state immediately before the cylindrical battery is housed in the cylindrical battery housing case.

Next, the actions of the elongated resilient members 10K2, 10K4 shown in FIG. 3C will be described using FIGS. 4A and 4B. FIG. 4A is a cross-sectional view illustrating a state immediately before the cylindrical battery is housed in the cylindrical battery housing case, and FIG. 4B is a cross-sectional view illustrating a state after the cylindrical battery has been housed in the cylindrical battery housing case.

FIG. 4A shows a state in which the cylindrical battery C is in the middle of being inserted into the cylindrical battery housing chamber 10 of the cylindrical battery housing case 1 and the distal end thereof is not yet making contact with the protrusion 10N2 of the elongated resilient member 10K2 and the protrusion 10N4 of the elongated resilient member 10K4. The elongated resilient member 10K2 and the elongated resilient member 10K4 are not yet bent.

Figure 4B:
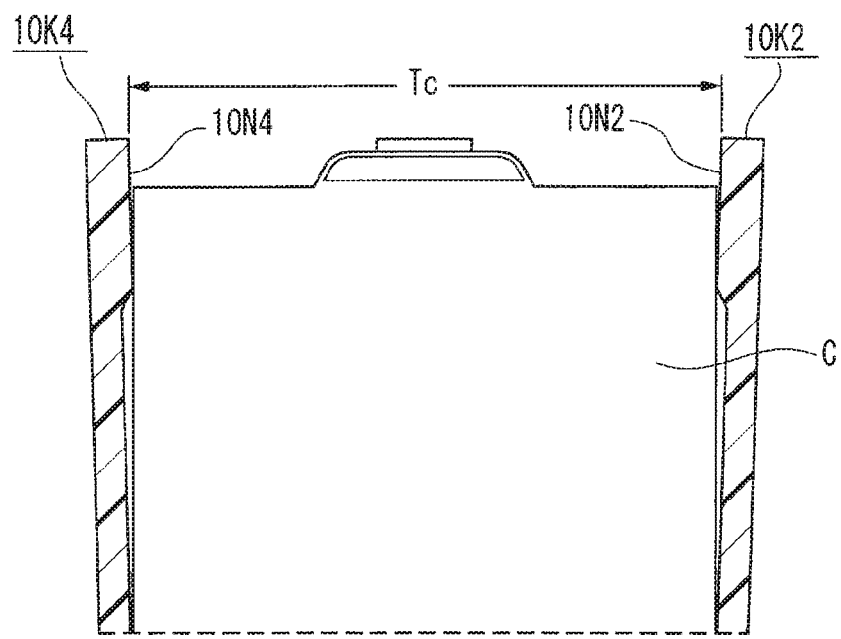
FIG. 4B is a cross-sectional view illustrating a state after the cylindrical battery has been housed in the cylindrical battery housing case.

FIG. 4B shows a state in which the cylindrical battery C makes contact with the protrusion 10N2 of the elongated resilient member 10K2 and the protrusion 10N4 of the elongated resilient member 10K4 and the cylindrical battery C is inserted further beyond the tapered portions of the protrusions 10N2, 10N4 and held between the protrusions, whereby the insertion of the battery is completed.

Although the elongated resilient members 10K2, 10K4 have been described referring to FIGS. 4A and 4B, the above descriptions also apply to the elongated resilient members 10K1, 10K3.

Hence, the cylindrical battery C is housed in the cylindrical battery housing chamber 10 in a state in which the cylindrical battery C is held from four directions by the protrusions 10N1 to 10N4 of the head portions of the four elongated resilient members 10K1 to 10K4 formed in a cantilevered manner on the side wall of the cylindrical battery housing chamber 10. With this configuration, when the cylindrical battery C moves inside the cylindrical battery housing chamber 10 during vehicle vibration, any one of the protrusions 10N1 to 10N4 is pressed, and the elongated resilient member corresponding to the pressed protrusion is bent, whereby the movement of the cylindrical battery C is absorbed. Since the elongated resilient members 10K1 to 10K4 contact the cylindrical battery C as described above, the cylindrical battery C is prevented from rattling in the front-rear direction and the left-right direction, whereby there is no risk that the welded section between the cylindrical battery C and the bus bar may be broken or the bus bar itself may be broken.

In addition, since the cylindrical battery C is housed in the cylindrical battery housing chamber 10 in the state in which the cylindrical battery C is held in the four directions by the protrusions 10N1 to 10N4 of the head portions of the elongated resilient members 10K1 to 10K4, the cylindrical battery is centered (that is to say, the cylindrical battery is positioned at the center of the cylindrical battery housing chamber 10), whereby the welding position of the battery and the bus bar can be determined easily.

Furthermore, since the cylindrical battery is held by the cylindrical battery housing chamber itself, other holding components are not required, whereby the number of components can be reduced.

While the cylindrical battery housing case 1 is configured such that a number of cylindrical battery housing chambers 10 described above are arranged in the vertical direction and the lateral direction in a similar manner, a more preferable cylindrical battery housing case 1 includes a mixture of the cylindrical battery housing chambers 10 described above and cylindrical battery housing chambers 10' which will be described below.

FIG. 1B shows the cylindrical battery housing chamber 10'. As in the cylindrical battery housing chamber 10, in the cylindrical battery housing chamber 10', four elongated resilient members 10'K1 to 10'K4 are formed in a cantilevered manner on the side wall of the cylindrical battery housing chamber 10, and protrusions are formed on the head portions at the distal ends thereof. The cylindrical battery housing chamber 10 and the cylindrical battery housing chamber 10' are different from each other in the locations where the four elongated resilient members are provided.

In the cylindrical battery housing chamber 10, viewing the four elongated resilient members as a clock, the notch 10S0 is formed at the 12 o'clock position, the notch 10S3 is formed at the 3 o'clock position, the notch 10S6 is formed at the 6 o'clock position, and the notch 10S9 is formed at the 9 o'clock position. On the other hand, in the cylindrical battery housing chamber 10', the arrangement of the notches is shifted by 45 degrees in the circumferential direction so that the notches are respectively formed at the 1:30 position, at the 4:30 position, at the 7:30 position and at the 10:30 position, as positions indicated by the short hand of the clock.

Further, inside the respective notches, elongated resilient members 10'K1 to 10'K4 having the same shape as those of the cylindrical battery housing chamber 10 are provided in a cantilevered manner at the bottoms of the notches.

With this configuration, the elongated resilient members 10'K1 to 10'K4 and the elongated resilient members 10K1 to 10K4 are disposed in a staggered manner, whereby space saving can be attained.

For example, the cylindrical battery housing chamber 10' has the elongated resilient member 10'K4 (first elongated resilient member) and the elongated resilient member 10'K1 (second elongated resilient member) adjacent thereto. The elongated resilient member 10K3 formed in a cylindrical battery housing chamber 10 in the row adjacent to the cylindrical battery housing chamber 10' is formed at an intermediate position between the first elongated resilient member and the second elongated resilient member in a front view of the cylindrical battery housing case.

A high-voltage high-current battery apparatus A is completed by combining the two cylindrical battery housing cases, the plurality of cylindrical batteries and the plurality of bus bars described above.

Figure 5:
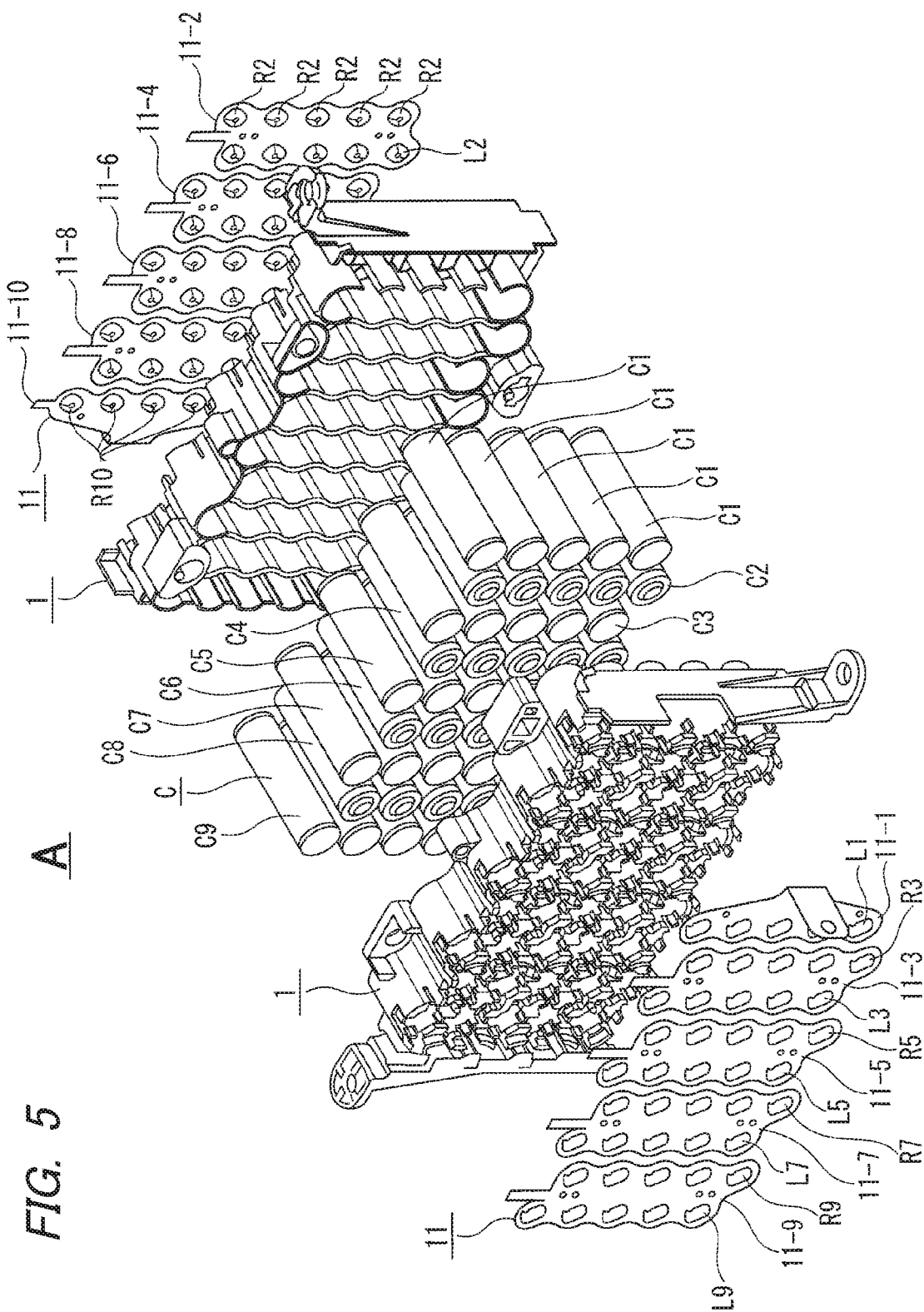
FIG. 5 is an exploded perspective view of a high-voltage high-current battery apparatus including the cylindrical battery housing case.
Figure 6A:
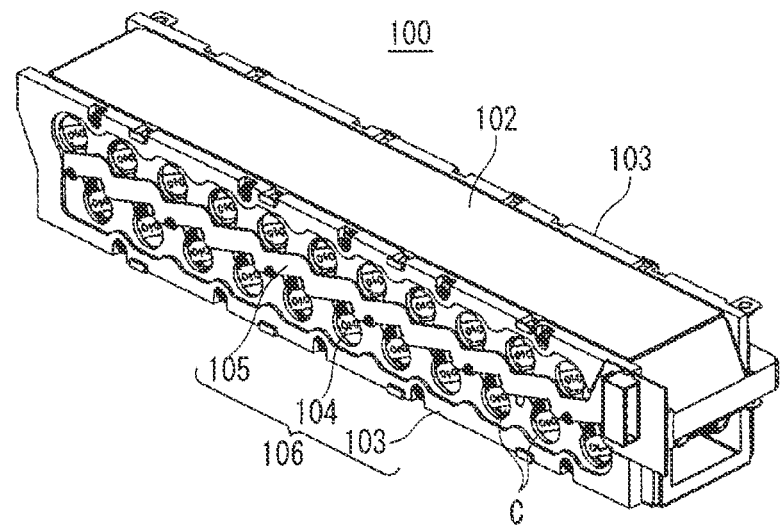
FIG. 6A is a perspective view of a related art cylindrical battery housing case in which cylindrical batteries are housed.
Figure 6B:
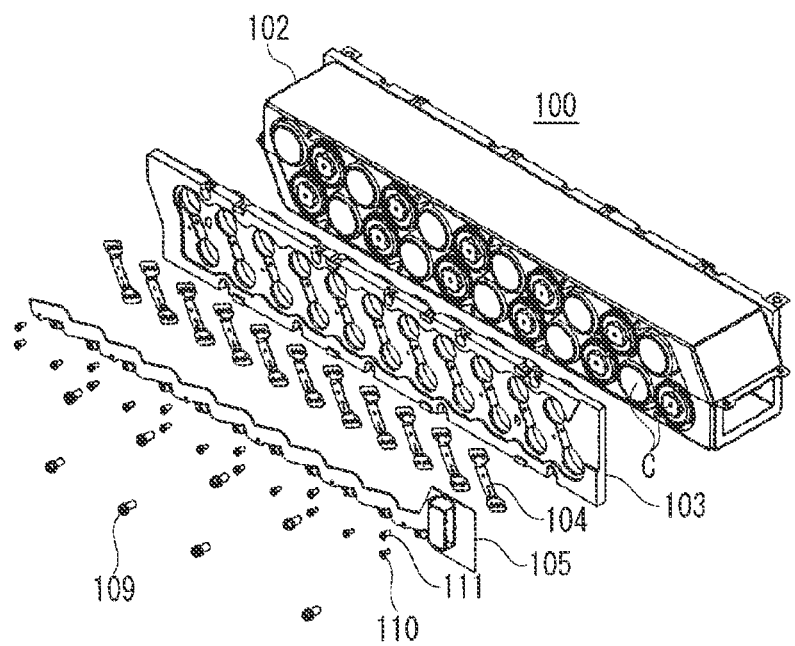
FIG. 6B is an exploded perspective view of the cylindrical battery housing case of FIG. 6A.
Figure 7A:
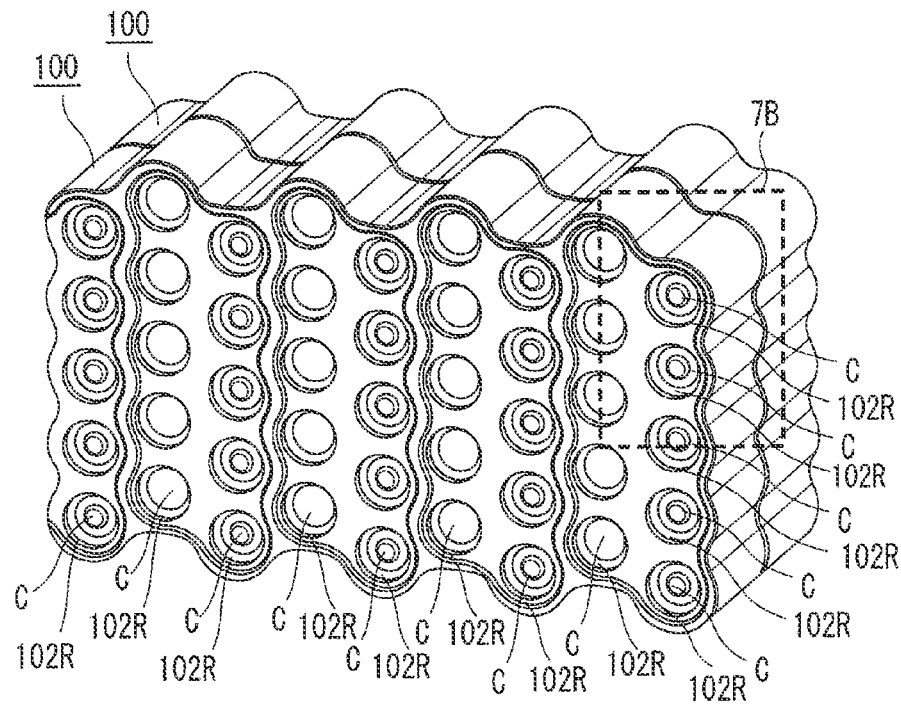
FIG. 7A is an enlarged perspective view of a portion of another related art cylindrical battery housing case.
Figure 7B:
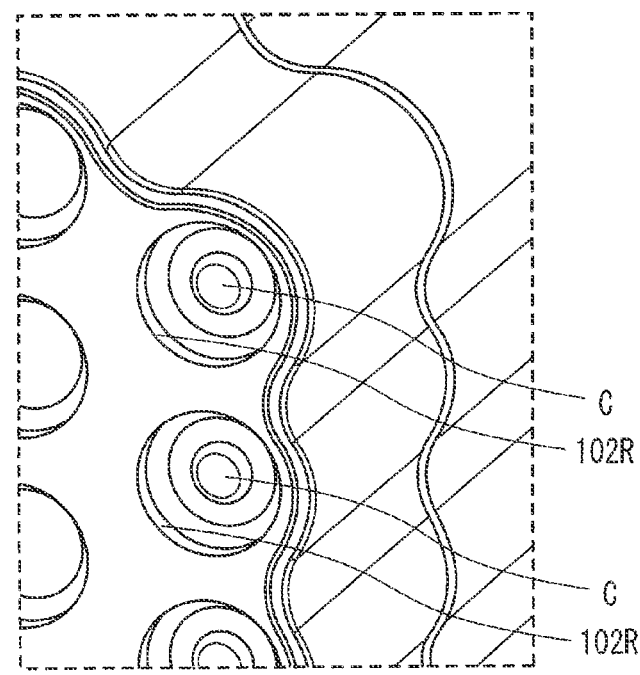
FIG. 7B is an enlarged view of the portion 7B of FIG. 7A.
Figure 8A:
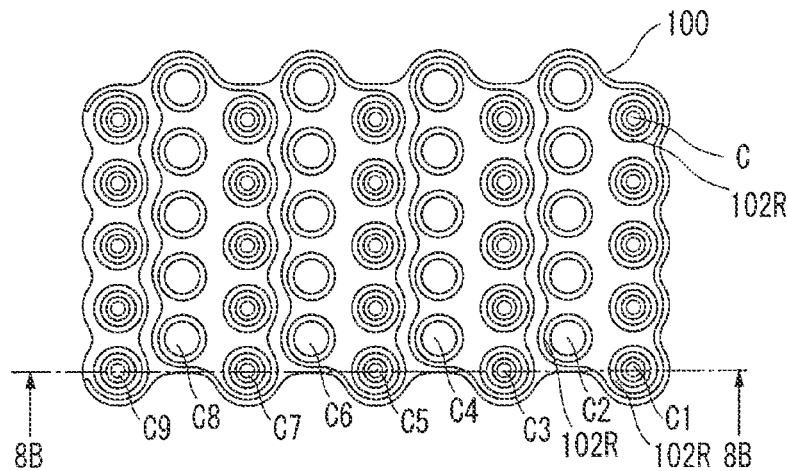
FIG. 8A is a front view showing the cylindrical battery housing case shown in FIG. 7A.
Figure 8B:
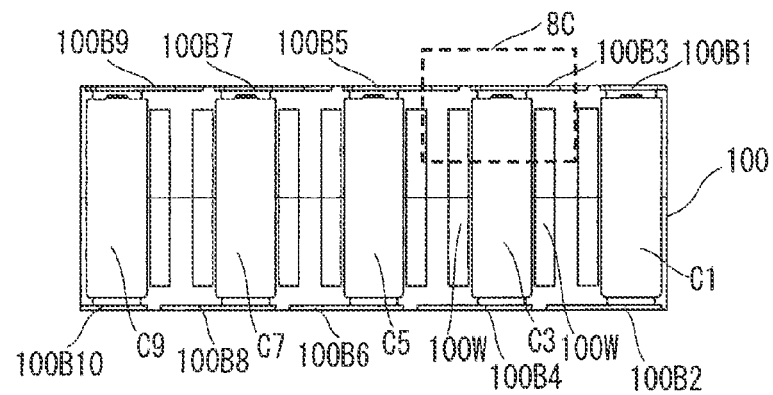
FIG. 8B is a cross-sectional view taken along the line 8B-8B of FIG. 8A.
Figure 8C:
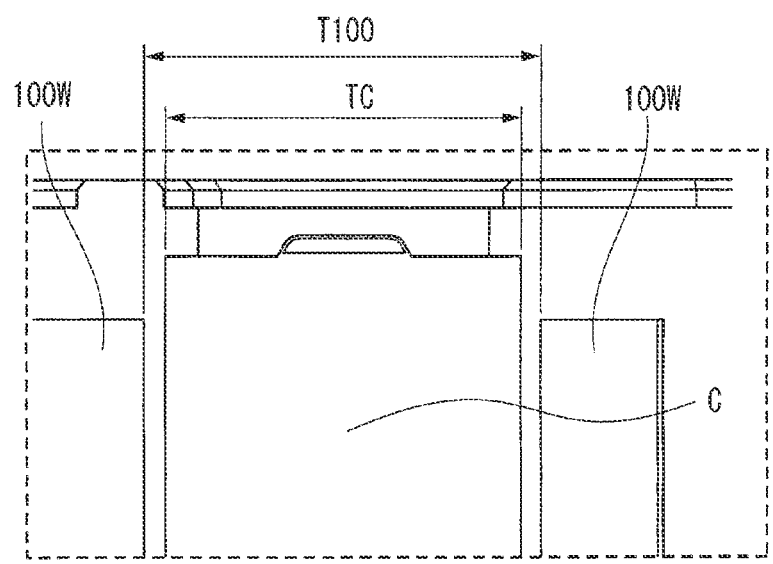
FIG. 8C is an enlarged view of the portion 8C of FIG. 8B.

FIG. 5 is an exploded perspective view of the high-voltage high-current battery apparatus A including two cylindrical battery housing cases 1. As shown in FIG. 5, in the high-voltage high-current battery apparatus A, the two cylindrical battery housing cases 1 are combined such that the sides on which the elongated resilient members are formed are arranged in a back-to-back manner, and one cylindrical battery C is housed in one cylindrical battery housing chamber 10 formed by the combination. The total of thirty cylindrical battery housing chambers 10 are formed, five chambers vertically arranged in the first row and six rows arranged in the lateral direction.

Five cylindrical batteries C1 are housed in the same direction in the five cylindrical battery housing chambers 10 vertically arranged in the first row. Further, all the five cylindrical batteries C2 vertically arranged in the second row are arranged such that the electrode directions thereof are opposite to those of the cylindrical batteries C1 in the first row.

Similarly, the cylindrical batteries C3, C5, C7, C9 in the odd-numbered rows are housed in the same direction as that of the cylindrical batteries C1, and the cylindrical batteries C4, C6, C8 on the even-numbered rows are housed in the same direction as that of the cylindrical batteries C2.

Bus bars 11 are available in two types: bus bars 11-1, 11-10 for a single row, and bus bars 11-2, 11-4, 11-6, 11-8, 11-3, 11-5, 11-7, 11-9 for two rows.

In the bus bar 11-1 for a single row, the projections L1 thereof are connected by welding to the respective cathodes of the five cylindrical batteries C1 arranged in the vertical direction on the first row.

In the bus bar 11-2 for two rows, the projections R2 of the bus bar 11-2 are connected by welding to the respective anodes of the five cylindrical batteries C1 arranged in the vertical direction on the first row, and the projections L2 of the bus bar 11-2 are connected by welding to the respective cathodes of the five cylindrical batteries C1 arranged in the vertical direction on the second row.

In the bus bar 11-3 for two rows, the projections R3 of the bus bar 11-3 are connected by welding to the respective anodes of the five cylindrical batteries C2 arranged in the vertical direction on the second row, and the projections L3 of the bus bar 11-3 are connected by welding to the respective cathodes of the five cylindrical batteries C3 arranged in the vertical direction on the third row.

In the bus bar 11-4 for two rows, the projections R4 (not shown) of the bus bar 11-4 are connected by welding to the respective anodes of the five cylindrical batteries C3 arranged in the vertical direction on the third row, and the projections L4 (not shown) of the bus bar 11-4 are connected by welding to the respective cathodes of the five cylindrical batteries C4 arranged in the vertical direction on the fourth row.

In the bus bar 11-5 for two rows, the projections R5 of the bus bar 11-5 are connected by welding to the respective anodes of the five cylindrical batteries C4 arranged in the vertical direction on the fourth row, and the projections L5 of the bus bar 11-5 are connected by welding to the respective cathodes of the five cylindrical batteries C5 arranged in the vertical direction on the fifth row.

Lastly after the repetition, in the bus bar 11-10 for a single row, the projections R10 thereof are connected by welding to the respective anodes of the five cylindrical batteries C9 arranged in the vertical direction on the ninth row.

As described above, nine groups, each having five cylindrical batteries connected in parallel, are connected in series, whereby the high-voltage high-current battery apparatus A is obtained.

Since the elongated resilient members are provided in each cylindrical battery housing chamber of the cylindrical battery housing case 1, there is no risk of breakage even if high vibration occurs.

As described above, with the cylindrical battery housing case according to exemplary embodiments the present invention, the cylindrical batteries are prevented from rattling even if high vibration occurs, whereby there is no risk that the welded section between the cylindrical battery and the bus bar may be broken or the bus bar itself may be broken. In addition, the cylindrical battery can be housed in the cylindrical battery housing chamber with a low insertion force, whereby working efficiency is improved. Further, sturdy elongated resilient members can be formed with a simple structure. Moreover, the elongated resilient members formed in a cylindrical battery housing chamber are shifted from the elongated resilient members formed in a cylindrical battery housing chamber adjacent to the cylindrical battery housing chamber in the circumferential direction in a front view, whereby space saving can be attained.

Here, features of the embodiments of the cylindrical battery housing case according to the present invention will be briefly summarized and listed in the following.

A cylindrical battery housing case (1) has a plurality of cylindrical battery housing chambers (10) each housing one cylindrical battery (C). Each of the cylindrical battery housing chambers has a side wall having notches and a plurality of elongated resilient members (10K1 to 10K4) formed in a cantilevered manner inside the notches, each of the elongated resilient members (10K1 to 10K4) having a protrusion configured to hold a cylindrical portion of the cylindrical battery. The plurality of cylindrical battery housing chambers includes a first cylindrical battery housing chamber and a second cylindrical battery housing chamber adjacent to the first cylindrical battery housing chamber, the plurality of elongated resilient members of the first the cylindrical battery housing chamber having a first elongated resilient member (10'K4) and a second elongated resilient member (10'K1), and the plurality of elongated resilient members of the second cylindrical battery housing chamber having a third elongated resilient member (10K3) arranged at an intermediate position between the first elongated resilient member and the second elongated resilient member in a front view of the cylindrical battery housing case.

While the present invention has been described in detail with reference to a certain embodiment thereof, it is apparent to those skilled in the art that various changes and modifications may be made therein without departing from the spirit and scope of the present invention.

The present invention can provide a cylindrical battery housing case in which rattling is prevented so as to be safe from being damaged even when high vibration occurs and to achieve high working efficiency by allowing cylindrical batteries to be housed in cylindrical battery housing chambers with low insertion force. The present invention having this advantage is useful for a cylindrical battery housing case for housing a number of cylindrical batteries.

What is claimed is:

1. A cylindrical battery housing case comprising:
   a plurality of cylindrical battery housing chambers, each of the cylindrical battery housing chambers being configured to house one cylindrical battery, wherein
   each of the cylindrical battery housing chambers comprises a side wall having a plurality of notches and a plurality of elongated resilient members provided in a cantilevered manner inside the notches, each of the elongated resilient members comprising a protrusion configured to hold a cylindrical portion of the cylindrical battery,
   the plurality of cylindrical battery housing chambers comprises a first cylindrical battery housing chamber and a second cylindrical battery housing chamber adjacent to the first cylindrical battery housing chamber,
   the plurality of elongated resilient members of the first cylindrical battery housing chamber comprises a first elongated resilient member and a second elongated resilient member arranged along a circumferential direction of the first cylindrical battery housing chamber, the plurality of notches in the side wall of the first cylindrical battery housing chamber includes a common notch, and the plurality of notches in the side wall of the second cylindrical battery housing chamber includes the common notch, and the plurality of elongated resilient members of the second cylindrical battery housing chamber comprises a third elongated resilient member located in the common notch and arranged, in a front view of the cylindrical battery housing case, at an intermediate position between the first elongated resilient member and the second elongated resilient member in the circumferential direction of the first cylindrical battery housing chamber.

2. The cylindrical battery housing case according to claim 1, wherein the side wall of each of the cylindrical battery housing chambers extends in an axial direction in which the cylindrical battery is inserted into the cylindrical battery housing chamber, wherein the notches extend along the axial direction from an end of the side wall, and wherein the elongated resilient members are supported at the bottoms of the notches in the cantilevered manner and extend in the axial direction.

* * * * *